Sept. 29, 1936.                    E. A. PERRIN                     2,055,585
                    SCREW CAPABLE OF CONVERSION INTO A FIXED WING
                    Filed March 8, 1934                2 Sheets-Sheet 1
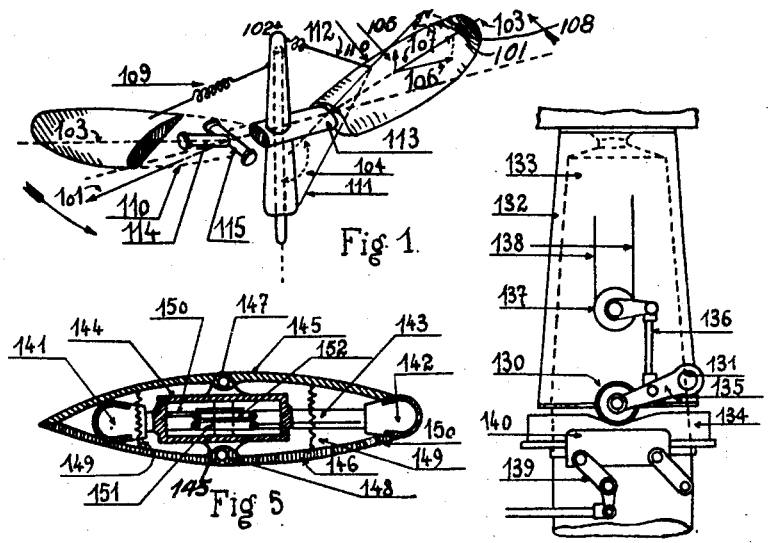
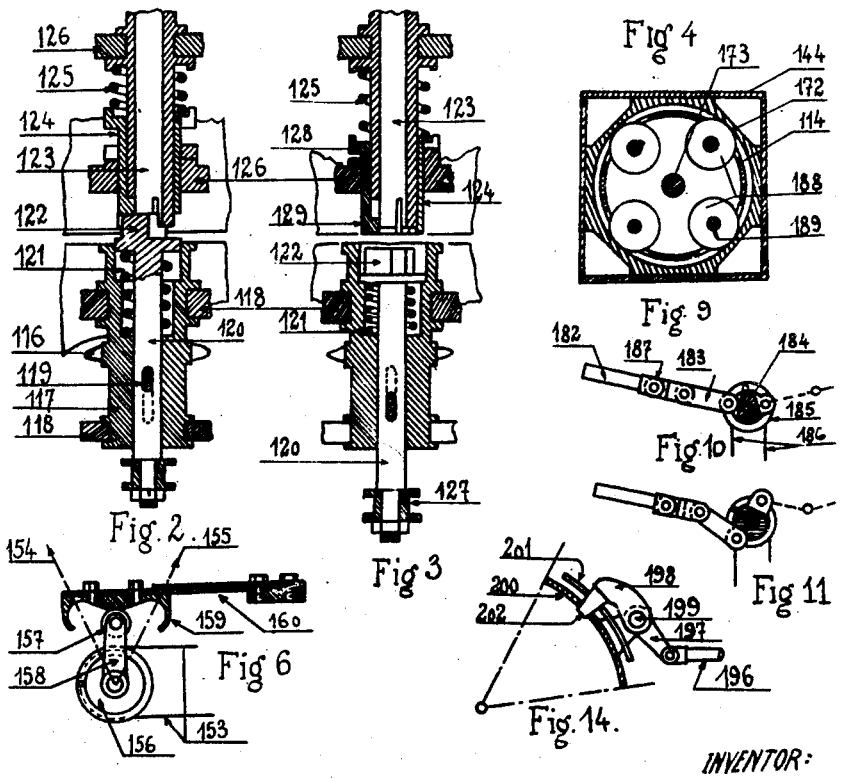
INVENTOR:
Edouard Alfred Perrin
BY
ATTORNEY

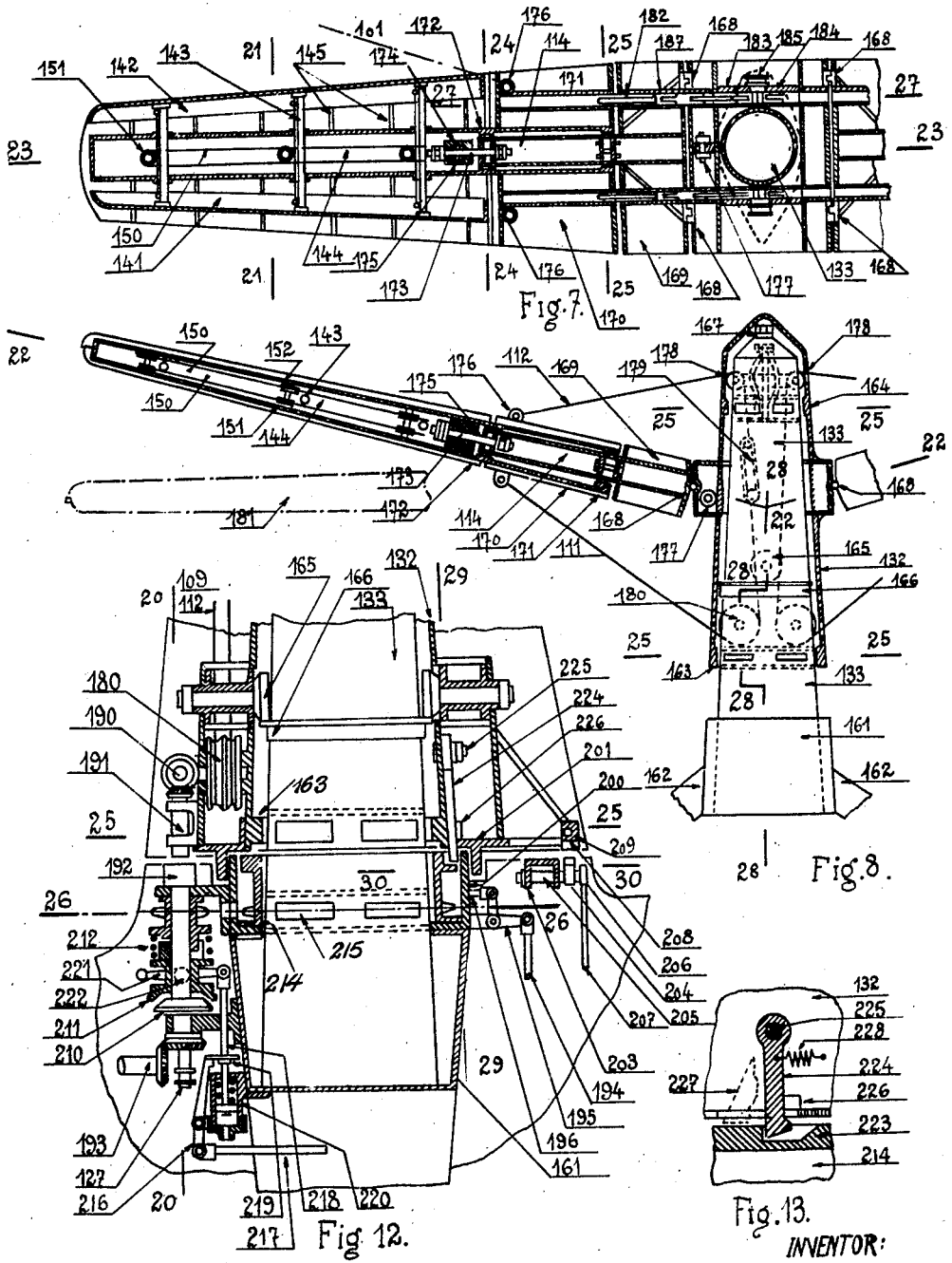

Patented Sept. 29, 1936

2,055,585

UNITED STATES PATENT OFFICE 2,055,585

SCREW CAPABLE OF CONVERSION INTO A FIXED WING

Edouard Alfred Perrin, Le Vesinet, France

Application March 8, 1934, Serial No. 714,703
In France March 17, 1933

7 Claims. (Cl. 244—19)

This invention relates to air screw propellers which can be converted into fixed planes, and has for its object an improved driving or sustaintaining means adapted to rotate in the surrounding atmosphere and means using the force resulting from the rotation produced by the action of their relative movement in a surrounding fluid, such as, for example, wind mills, air propellers or similar apparatus.

In connection with supporting systems for machines for aerial navigation, suggestions have been made previously to provide such machines with two supporting propellers adapted to revolve in opposite directions, means being provided for locking and unlocking so as to lock them in a suitable position, or to allow their rotation at the pilot's will, while means are also provided for varying the incidence of the blades of the propellers.

According to the present invention an air screw propeller or the like is mounted on a shaft to which it is capable of being locked so that it may act as a sustaining plane, and from which it can be released to permit its rotation about the said shaft, whereas the incidence of the blades of the propeller can be varied when the propeller is adapted to rotate. More specifically the blades of the propeller are connected to a hub capable of being locked and unlocked from the shaft on which it is mounted by a hinge so as to enable the normal theoretical axis of the blade to be moved from a horizontal position to a position inclined relatively to the axis of rotation about an axis at right angles to the axis of rotation.

The invention will now be described with reference to the accompanying drawings, wherein:

Figure 1 shows a perspective view of an air screw propeller;

Figure 2 shows a sectional view of one form of a device for connecting and disconnecting a rotary member to and from a stationary member taken on line 2—2 of Fig. 12;

Figure 3 shows a similar view of the device in Fig. 2 in the disengaged and locked position;

Figure 4 shows a detail view of a form of actuating mechanism actuated as a result of relative rotary movement between a rotary member and a stationary member, with a device whereby the mechanism may be actuated independently of the relative rotation;

Figure 5 is a cross section of a blade of an air screw propeller on the line 5—5 of Fig. 7;

Figure 6 shows a detail view of an arrangement for causing an actuating mechanism to move into its end positions with a snap action and for locking the actuating mechanism in these positions;

Figure 7 is a sectional view of a blade of an air screw propeller and its mounting taken on the line 7—7 of Fig. 8;

Figure 8 is a vertical sectional view taken on the line 8—8 of Fig. 7;

Figure 9 is a section of a roller bearing taken for example, on the line 9—9 of Fig. 7;

Figures 10 and 11 show detail sectional views of a locking device for the blades in the locking and unlocked positions, respectively, taken on line 10—10 of Fig. 7;

Figure 12 is a section on the line 12—12 of Fig. 8 to a larger scale;

Figure 13 is a fragmentary section on the line 13—13 of Fig. 12 to a larger scale, and Figure 14 is a fragmentary section on the line 14—14 of Fig. 12 to a larger scale.

As shown in Fig. 1 the blades of an air screw propeller, according to the present invention, after the propeller has been released for rotary movement, are capable of having their incidence varied by tilting them about their theoretical axis 101. This theoretical axis, normally secured to the axis of rotation 102 when the propeller serves as a sustaining plane, is capable of being more or less inclined relatively to the axis 102 so as to extend along the line 103.

The angle of inclination 104 of the theoretical axis 101 relative to the axis 102 is so selected that during the normal rotation of the propeller the sustaining force 105 acting on the blade and the centrifugal force 106 produce a resultant 107 extending substantially along the center line 103 of the blade. The angle of inclination 108 between the center line 103 and the theoretical axis 101 is so selected that during normal rotation of the propeller the centers of the sustaining and centrifugal forces are located behind the theoretical axis 101.

Under these conditions there corresponds to every increase in the sustaining force, acting on the blade and opposing centrifugal force, a lifting of the portion of the blade behind the theoretical axis 101 and consequently a correlative and correcting reduction of the incidence of the blade relative to its path through the surrounding atmosphere. Conversely any reduction in the sustaining force increases relatively the action of centrifugal force and produces a lowering of the rear portion of the blade, thus producing a correlative and corrective increase of the incidence.

This correcting effect takes place automatically irrespective of the cause of the initial variation of the sustaining force 105 acting on the blade, that is to say, whether this action is due to the action of the surrounding atmosphere, or whether it is due, for example, to the forces of inertia known as gyroscopic forces or compound centrifugal forces.

When the theoretical axis 101 passes slightly in front of the centers of the sustaining and centrifugal forces, the variation of the correcting incidence reaches a high amplitude relative to that of the correlative variation of the inclination of the center line 103 relatively to the axis of rotation 102. Neglecting these latter variations, which are of small amplitude, the sustaining force 105, during normal rotation, is substantially constant relative to the centrifugal force 106 acting on the blade. This arrangement therefore substantially annuls automatically any variations in the sustaining force 105, which would otherwise produce, during the normal rotation of the axis 102, variations in the relative speeds of the blades through the surrounding atmosphere, or even gyroscopic inertia forces created by any possible rotation of the propeller about axes other than the axis 102.

This arrangement therefore eliminates automatically in practice couples which would disturb the equilibrium of the apparatus and which are derived from the sustaining propeller, which itself is fixed, irrespective of the method for producing rotation, that is to say, whether rotation is produced by a separate motor which drives the propeller mechanically, or as a result of auto-rotation, for example, by lateral movement in the surrounding atmosphere.

It is also possible to vary the initial normal angle of inclination of the center line 103 relatively to the axis 102 by a graduated action of elastic devices, such as the tie wire 109 by which the blade is connected to the axis of rotation 102.

Finally, the position of the theoretical axis 101 may be fixed relatively to the axis 1 by securing a point 110, which is located in front of the axis 101, to the axis 102 by two stays 111 and 112. One of these stays, preferably the stay 112 which normally supports a smaller force than the lower stay 111, may include an elastic element which enables it readily to lend itself to slight variations in length and thus to facilitate orienting the blade.

The point of junction 113 of the blade to its hub is located in such a position that the blade can transmit effectively to the hub the various forces acting on the blade, thus reducing the work of the stays 111 and 112. Thus the blade may, for example, be rotatably mounted on a shaft 114 which is at right angles to a hinge 115 on the hub.

In Figs. 7 and 8 the hub of the propeller is secured to a sleeve 132 (Fig. 8) capable of rotating on a shaft 133 which is secured to the apparatus by means of a casing 161 and two lateral webs 162. The rotation of the sleeve is facilitated by circular races 163, 164 on the sleeve with which engage rollers projecting from the shaft 133 in the planes 25—25, Fig. 8. The vertical downward thrust is taken up by two rollers 165 mounted on the sleeve 132 and running on a shoulder 166 on the shaft 133. The dead weight is supported by an upper axial bearing 167.

The inner sections 169 of the blades are connected to the hub at 168 by a group of four hinges corresponding with the hinge 115 in Fig. 1.

Each of these sections carries the longitudinal tubular shaft 114. The middle section 170 of each blade can turn about the shaft 114 by means of circular roller tracks 171, 172 with which co-operate rollers projecting from the tubular shaft 114, as shown to a larger scale in Fig. 9.

In the outer end of the shaft 114 is mounted a rod 173 which is secured to the blade by keys 174 and a central block 175.

The stays 111, 112 connect the sleeve 132 to tubes 176 which pass across the middle section of the blade and determine the position of the theoretical axis 101.

The elasticity of the stay 112 may be provided for by resiliently mounting the upper pulleys 178, or by means of resilient rings 179 which are arranged between the pulleys 178 and the lower winch drums 180.

The blades, initially set at 181, when the propeller is to be used as a sustaining plane, are raised to the full line position when the propeller is to be used as a helicopter, or is to be driven by auto-rotation by means of winches 180. One of the winch drums may be constructed as a cam so as to take into account for the movement of the tubes 176 during the lifting movement.

Before the blade can be moved into the inclined position it is necessary to release the engagement between the inner section 169 from the hub and also the engagement between the middle section 170 and the inner section 169, so as to enable the blade to have its incidence varied for use as a helicopter or air propeller. The engagement between the middle section 170, the inner section 169 and the hub is, for the sake of convenience, hereinafter referred to as the "internal locking device". This internal locking device is shown in detail in Figs. 10 and 11 in the locking and released positions respectively. This device consists of hinged bolts 182 which engage with tubular housings in the middle sections 170 and in the inner sections 169 of the blades. These bolts are held in the locking position by connecting rods 183 actuated by a central block 184 which is secured to a pulley 185 operated by a cable 186 (Figs. 7 and 10). Between the bolts 182 and the rods 183 are provided hinges 187, which, in the released position, are brought into alignment with the hinges 168 so that the blade can turn on the latter.

The internal locking device may be released before the sleeve 132 has been disengaged from the shaft 133 or after this disengagement and mechanism for this purpose is shown in Fig. 4.

In Fig. 10 the bolts 182 are shown in the locking position, the connecting rods 183 being in alignment therewith, in which position they are held by the central member 184 which has been actuated by the cable 186 and pulley 185.

Fig. 11 shows the unlocked position after the pilot has rotated the member 184 through a sufficient angle to cause the connecting rod 183 to withdraw the bolt 182 from its housing in the middle section 170 (Fig. 7), thus disengaging the latter from the inner section 169, while at the same time bringing the hinge 187 into line with the hinges 168.

In Fig. 4 a roller 130 is mounted in a fork 135 pivoted to the sleeve 132 mounted for rotation on the shaft 133. This roller 130 co-operates with a cam 134 fixed to the shaft 133 which is so shaped, that after a predetermined amount of rotary movement of the sleeve 132 the roller 130 rises in the cam surface 134 and thus lifts the fork 135 which through the medium of a rod 136 imparts an angular movement to a pulley 137. Around this pulley 137 passes a cable 138 (186 in Figs. 10 and 11) which actuates the pulley 185 and thus the block 184 of the internal locking device. When the internal locking device is to be actuated before the sleeve 132 is disengaged from the shaft 133, the pilot actuates a bellcrank lever 139 so as to raise an auxiliary cam 140 which lifts the roller 130. In this manner the internal locking device is rendered independent of the rotation of the sleeve 132.

When the roller 130 engages with the recessed portion of the cam 134 or the bellcrank lever 139 is moved in the opposite direction, and the internal locking device is moved into the engaging position.

In Fig. 5 is shown an arrangement whereby the leading edge of a blade can be changed to a trailing edge and vice versa. As shown, there are provided two channel members 141, 142 which extend longitudinally along the greater portion of the edges of the blade; these members 141, 142 are connected together by transverse members 143 which pass through a central frame 144. Ribs 145, 146 to which the fabric of the blade is secured, are hinged at 147, 148 to lugs secured to the frame 144. The ribs are drawn together on opposite sides of the hinge points 147, 148 by springs 149 whereby the ends of the ribs are held against the members 141, 142. The transverse members 143 are moved transversely to the blade by means of cables 150 secured to the said members 143 and passing around pulleys 151, 152. The cables 150 then pass through the central frame 144 and are attached to a pulley 177. This pulley is adapted to be actuated by a mechanism similar to that shown in Fig. 4. In this case the pulley is actuated directly by the cable 138.

In Fig. 6 is shown an arrangement for ensuring the movement of the pulley 177 into its end positions and thus locking the members 141, 142 in the position into which they have been moved. In this construction the cable 153, corresponding with the cable 138 in Fig. 4, passes around a pulley 156, keyed to the same shaft as the pulley 177. To the shaft of the pulley 156 is keyed a fork 158 carrying a roller 157 which is secured to the sleeve 132. The cam is provided with recessed portions adapted to receive the roller 157 in its end positions indicated at 154, 155. As a result of the spring mounting of the cam 159 the roller 157 moves into its end position with a snap action and as a result locks members 141, 142 in position. The arrangement shown in Fig. 6 may also be provided in combination with the mechanism shown in Figs. 10 and 11.

As shown in Fig. 12 the winches 180 are mounted at the lower end of the sleeve 132. The winches 180 are operated by bevel wheels on an intermediate shaft 190 and a driving shaft 191. The latter can be driven through a clutch, similar to that hereinafter described with reference to Fig. 3 by a shaft 192 when the clutch is engaged as a result of upward movement applied at the annular groove 127. The shaft 192 is driven by the engine of the machine or by an air screw propeller which drives a shaft 193 connected to the shaft 192 by bevel wheels for the purpose of rotating the sleeve 132.

The sleeve 132 is unlocked by actuating a rod 194 (Fig. 12) and a bell crank lever 195. The latter, through the medium of a rod 196 (Fig. 14) actuates a lever 197, keyed to a shaft 199 carried by a lug secured to the sleeve 200 which is secured to the casing 161. To the shaft 199 is also keyed an arm 198 provided with a tooth 202 which engages with slots in a ring 201, secured to the sleeve 132, and in the sleeve 200 fixed to the shaft 133. When the rod 194 is pulled this tooth 202 is disengaged from the slots, thus releasing the ring 201 and consequently the sleeve 132. A further locking device is provided at 203 (Fig. 12). This locking device has a tooth 204 which is mounted in a shaft 205 and which can be moved into an upwardly directed position by the pilot by means of a lever 206 and a rod 207. In this position the tooth 204 engages with a slot in a member 208 which is secured to the sleeve 132 by a threaded rod 209. By means of this arrangement it is possible, after the parts have been locked together, to take up any play between the member 208 and the sleeve 132 so as to obviate any deleterious vibrations of the locked system.

A male cone clutch member 210 is mounted on the shaft 192 and co-operates with a female cone clutch member 211 loosely mounted on the shaft 192. The female member 211 is normally urged into the engaging position by a weak spring 212 and is connected to a chain wheel 213 by a dog clutch. The chain wheel 213 drives a chain located in the plane 26—26 and this drives a ring 214 mounted on a roller 215 carried by the spindle 133.

The clutch members 210, 211 can be engaged by the pilot by actuating the lever 216 through the medium of a rod 217. When the rod 217 is pulled, the lever 216 leaves a shoulder 219 on a rod 218, which latter is then pulled downwardly by a spring 220 which was previously compressed. The upper end of the rod 218 acts on a pair of levers 221, pivotally mounted at their other end and through the medium of rollers 222, carried by the levers 221 and engaging with an annular groove in the female cone 211, force the latter into engagement with the male cone 210, whereby the ring 214 is rotated by means of the chain in the plane 26, 26.

In its upper end the ring 214 is provided with recesses 223 (Fig. 13) with which co-operate driving pawls 224 pivoted at 225, to the ring 132, which they are adapted to drive through stops 226. The notches 223 are so shaped that when the sleeve 132 is rotated in one direction, viz: to the right in Fig. 13, the pawls 224 move into the dotted position 227 against the action of the spring 228 and thus do not drive the ring 214. The spring 228 normally serves to hold the pawls 224 against the stops 226.

In Figs. 2 and 3 is shown a simplified form of the driving mechanism shown in the planes 2—2 in Fig. 12. In Figs. 2 and 3 the drive from a suitable prime mover is transmitted by a chain, not shown, to a sprocket wheel 116 formed integral with a sleeve 117 rotatably mounted in bearings 118 provided on a fixed part of the apparatus. The sleeve 117 is provided internally with a longitudinal groove with which engages a key 119 projecting from a shaft 120 slidably, but non-rotatably mounted in the sleeve 117. The shaft 120 is normally urged upwards by a spring 121. At the upper end of the shaft 120 is provided a clutch member 122 having three radial dogs adapted to co-operate with corresponding recesses or notches in a clutch-member 123 adapted to transmit its movement to the sleeve 132. The member 123 is mounted in bearings 126 on the sleeve 132, its lower end passing through a sleeve 124 normally urged downwardly by a spring 125.

In the engaged position of the members 122 and 123, shown in Fig. 2, the sleeve 124 has been pushed upwardly by the member 122 against the action of the spring 125, thus disengaging teeth 128 on the member 124 from corresponding teeth on the lower bearing 126, so as to permit of rotation of the latter and of the member 123 to which it is keyed.

In order to disengage the members 122, 123 the pilot actuates suitable rod mechanism engaging with a circular groove 127 at the lower end of the shaft 120, whereby this shaft is pulled downward. Upon downward movement of the shaft 120, the dogs of the clutch member 122 are disengaged from the recesses in the member 123, while at the same time the non-rotatable sleeve 124 is forced downwardly by the spring 125, whereby the teeth 128 thereon engage the teeth of lower bearing 126, thus locking the sleeve 124 against rotation. The sleeve 124 engages with the member 123 by means of teeth 129, thus also locking this member.

In order to provide for substantially frictionless movement between the relative rotating parts, roller bearings are provided in the planes 9—9, 25—25, Fig. 7, 25—25, Figs. 8 and 12, and 26—26, Fig. 12. These bearings are of substantially similar construction and will be described with reference to Fig. 9, which is a section on the line 9—9 of Fig. 7 on a larger scale. As shown, the central frame 144 of the blades is provided with a circular roller track with which co-operate four rollers 188 mounted on shafts 189 carried by lateral plates forming stays for the tubular shaft 114. The rod 173 is located at the center of these plates.

As will be readily understood the arrangement shown in Fig. 9 can be directly applied to the roller bearings in Figs. 8 and 12.

By means of the arrangements above described it will be seen that the propeller may be used, when locked in position, that is to say, when prevented from rotation as a sustaining plane.

When released the blades of the propeller may be inclined relatively to the axis of rotation, while the trailing edge of one or both blades may be changed into a leading edge as may be required.

Aircraft provided with apparatus as above described is capable of acquiring high travelling speeds with an economy in the consumption of power, when the propeller is fixed, while it can land within a comparatively small area in an aerodrome or on uneven ground at a comparatively low speed.

The actuating and releasing devices are all controlled from the pilot's cabin.

I claim as my invention:—

1. A combined air screw propeller and sustaining surface comprising a hub, a plurality of blades having separate inner and middle sections, a hinge connecting the inner section of each blade to the hub for movement relative thereto about an axis tangential to an arc described about the axis of rotation of the hub, and means connecting the middle section of each blade to its inner section to provide for adjustment of the incidence of the middle section.

2. A combined air screw propeller and sustaining surface comprising a hub, a plurality of blades having separate inner and middle sections, a hinge connecting the inner section of each blade to the hub for movement relative thereto about an axis tangential to an arc described about the axis of rotation of the hub, means connecting the middle section of each blade to its inner section to provide for adjustment of the incidence of the middle section, a shaft supporting said hub, means for detachably locking said hub to said shaft, means for locking said inner section to said middle section and to said hub, and lock-actuating means operable for releasing the lock between said propeller sections and hub before releasing the lock between said hub and shaft.

3. An air screw propeller according to claim 2 wherein the lock-actuating means includes an actuating member, a cam and a roller co-operating with the cam for rocking said member.

4. An air screw propeller according to claim 2 including a one-way ratchet mechanism between said hub and shaft.

5. An air screw propeller according to claim 2 wherein the actuating means includes an actuating member and snap action means for moving the actuating member to its extreme positions.

6. A combined air screw propeller and sustaining surface, comprising a vertical shaft, a hub mounted on said shaft, means for detachably locking the hub to said shaft, a plurality of blades, a universal hinge connecting each blade to said hub, and means for moving the normal theoretical axis of the blades from a horizontal position to a position inclined relatively to the axis of rotation, said moving means including a driving shaft and a driven shaft and a clutch adapted to be controlled by the pilot for coupling said shafts.

7. An air screw propeller according to claim 6 including a one-way ratchet mechanism between said hub and shaft.

EDOUARD ALFRED PERRIN.